June 2, 1936.  C. FINCH  2,043,160

SELF STARTING SYNCHRONOUS MOTOR

Filed July 21, 1934

Inventor
Clark Finch,
By
Attorney

Patented June 2, 1936

2,043,160

UNITED STATES PATENT OFFICE 2,043,160

SELF-STARTING SYNCHRONOUS MOTOR

Clark Finch, West Palm Beach, Fla.

Application July 21, 1934, Serial No. 736,419

3 Claims. (Cl. 172—275)

This invention relates to a self-starting synchronous motor and constitutes an improvement over my previous application Serial Number 677,942, filed June 27, 1933, relating to Self-starting synchronous motors. These improvements reside in the construction and mounting of the rotor, the formation of the casing in which the rotor is housed, and the relation of the housing to the field ring and magnet.

The principal object of this invention is the production of a simple and efficient self-starting synchronous motor which is so constructed that it may be designed to run at 1200 revolutions per minute, it being only necessary to increase the number of spokes or divisions in the rotor to reduce the speed to 900 or 600 revolutions per minute or any speed desired.

A further object of this invention is the production of a simple and efficient slow speed self-starting synchronous motor which is timed and controlled by the synchronous impulses through each spoke of the rotor as the impulses pass through the lugs which are supported or carried by the field ring.

Other objects and advantages of the present invention will appear throughout the following specification and claims.

In the drawing:—

Figure 6:
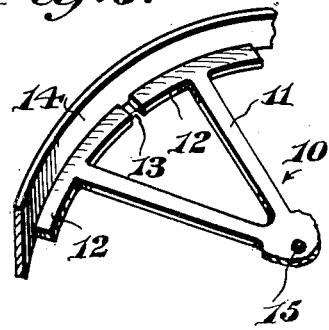
Figure 6 is a fragmentary perspective view showing the manner in which the spokes of the rotor engage the connecting band or steel ring.

In carrying out this invention, I provide a rotor 10 which consists of a plurality of radiating spokes 11, the spokes being in numbers of 6, 8, or 12, depending upon the revolutions desired. For instance, in a six-spoke rotor, 1200 revolutions may be obtained; with an eight-spoke rotor, 900 revolutions may be obtained; and with a twelve-spoke rotor, 600 revolutions obtained. Each spoke 11 is provided with a radial shoe 12, the various shoes of the spokes being spaced as indicated at 13. These radial shoes 12 are reinforced and connected to a steel connecting band or ring 14 in a manner as shown in detail in Figure 6. The outer edges of the radial shoes 12 may be soldered or in any way fixedly secured to the band 14. The rotor 10 is journaled upon a suitable journal 15. The journal or bearing 15 is supported by the clock case 16 which is preferably formed of non-magnetic material and this clock case 16 is provided with an overhanging flange 17 around the edge thereof.

The journal 15 supports a pinion 18 which meshes with a gear 19, which gear 19 is carried by a shaft 20, the shaft 20 also carrying a driving pinion 21 which pinion may be utilized for driving any suitable or desired clockwork mechanism.

Figure 5:
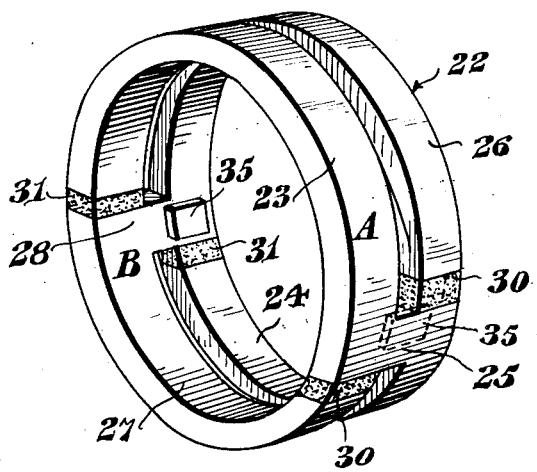
Figure 5 is a detail perspective view of the field ring showing the magnetic lugs supported upon the inner face of the ring.

In Figure 5, there is shown in detail the structure of the field magnet or field ring which is indicated by the numeral 22, and is of the same character as that described and illustrated in my previous application Serial Number 677,942, filed June 27, 1933, this field ring conforming to the contour of the rotor. The field magnet or field ring 22 comprises a pair of sections A and B, each section being substantially Z-shaped in formation, and the sections are arranged in staggered spaced relation as will be obvious by considering Figure 5. The section A comprises a substantially semicircular curved arm 23 and an offset oppositely extending curved semicircular arm 24, the arms 23 and 24 being connected by means of a laterally extending neck portion 25. The section B is similarly constructed to the section A, and comprises a substantially semicircular curved arm 26 and a substantially semicircular or curved arm 27, the arms 26 and 27 being oppositely extended and arranged in staggered relation with respect to the arms 23 and 24, as will be obvious by considering Figure 5. These arms 26 and 27 are connected by means of a laterally extending neck portion 28. The arms 24 and 26 are securely fastened or soldered to the under face of a suitable connecting or supporting band 29 preferably formed of non-magnetic material. The spaces between the ends of the arms 26 and 27 and the neck portion 25 are preferably filled by means of solder or other suitable material 30. The spaces between the ends of the arms 24 and 23 and the neck portion 28 are preferably filled with a block of solder or other suitable material 31 in a manner similar to that as described in my previous application above mentioned.

Figure 1:
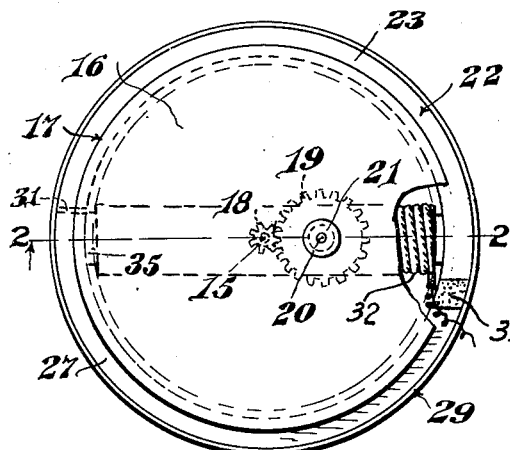
Figure 1 is a rear elevation of the clock motor illustrating the field ring and the manner in which the gear case is supported thereon.
Figure 4:
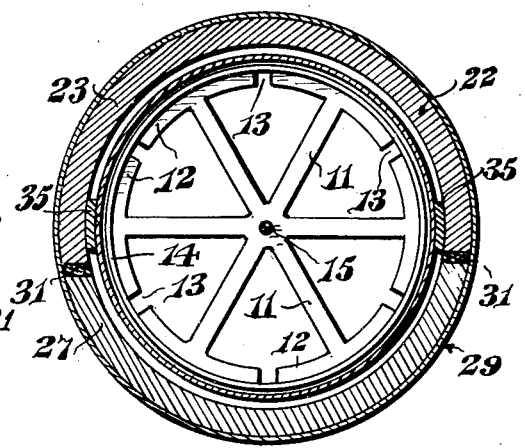
Figure 4 is a section taken on line 4—4 of Figure 3.
Figure 2:
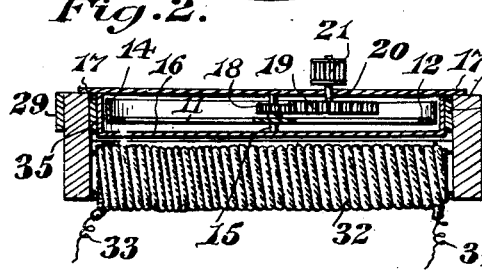
Figure 2 is a transverse sectional view taken on the line 2—2 of Figure 1.
Figure 3:
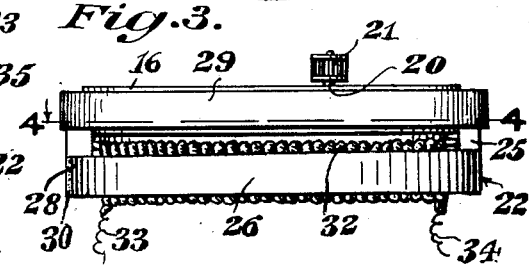
Figure 3 is a top plan view of the structure shown in Figure 1.

An electro-magnet 32 extends diametrically through the field ring 22 with its ends secured to the portions 25 and 28 thereof adjacent ends of the portions 23 and 27 and as shown in Figures 2 and 3 of the drawing the magnet may be electrically connected by means of suitable electric wires 33 and 34 to a suitable source of electric supply.

Fixedly secured to the inner face of each of the neck portions 25 and 28 is an iron (preferably soft iron) lug 35 consisting of a flat block-like structure and fitting snugly in engagement with the periphery of the case 16, as shown in Figure 2. The flange 17 overhangs one edge of the field ring 22, as shown in Figure 2, and the case in this manner would be firmly held upon the field ring. The iron lugs 35 when magnetized will act directly upon the segmental shoes 12 of the rotor 10 for the purpose of actuating this rotor. As shown in Figure 2, the case 16 is placed in one end of the field ring 22 and supported in this position, the gear case 16 supporting the gears illustrated as well as the rotor 10 and may also constitute an oil carrier, if desired.

It should be understood that high speed in a clock motor is undesirable since high speed will cause noise and excessive wear, as well as require a greater number of gears to slow down the motor to a proper speed. In reducing the speed of the motor or synchronizing, I have used only the same simple, economical construction as is used in my high speed motor disclosed in my application Serial Number 677,942. The rotor 10 is slightly heavier than the rotor in the high speed motor previously referred to, and is mounted within the gear case 16, which gear case is inserted or set down within the field ring 22, as shown. It has been found by experiment that the forward corners of the neck portions 25 and 28 where the lugs are attached are the magnetic poles of the field ring, and these lugs project toward the rotor and at each alternation of the current, the lugs exert a strong impulse through each spoke as it passes the lug. This attractive impulse counts or times each spoke as it passes the given lug. With this arrangement the rotor is turned or driven principally by the non-synchronous starting force and is timed or controlled by the synchronous impulses through each spoke as it passes the lugs. This impulse is an attractive force and can retard each spoke if it is a little fast, or boost up if it is a little slow. This construction previously described provides a very simple and economical structure and does not increase the size of the motor.

In reducing the invention to practice, the gear case is preferably of non-magnetic material, whereas the outer rim of the rotor may be of steel. The inner parts of the rotor may be of steel or of soft iron.

Having described the invention, what is claimed as new is:

1. In a motor of the class described, a cylindrical field ring, a case fitted within said cylindrical field ring and having a marginal flange bearing against one end of the cylindrical field ring, a rotor rotatably mounted within the case, the rotor comprising a predetermined number of radiating segments, a ring of magnetic material carried by and bridging outer ends of the segments, the cylindrical field ring comprising a plurality of offset oppositely extending curved arms of magnetic material conforming to the contour of said rotor, a ring of non-magnetic material surrounding the arms and secured to the same for supporting the arms in assembled relation, magnetic lugs secured to the inner face of said cylindrical field ring at diametrically opposite points, and an energizing coil extending diametrically through said cylindrical field ring with its ends contacting with said lugs whereby magnetic impulses will be passed through said lugs for actuating said rotor.

2. In a motor of the class described, a cylindrical field ring comprising a pair of similarly constructed sections, each section having offset oppositely extending curved arms and a bridge connecting ends of the arms, means for securing the sections in operative relation to each other with their arms spaced transversely from each other, a case fitted into one end portion of said cylindrical field ring, an operating shaft extending through said case and rotatably mounted, a rotor carried by said shaft within said case, said rotor comprising a plurality of radiating arms having segmental shoes, a metallic connecting ring bracing and connecting all of the shoes, and an energizing coil carried by said cylindrical field ring, and extending diametrically through the same between the case and the other end portion of said cylindrical field ring.

3. In a motor of the class described, a cylindrical field ring comprising a pair of similarly constructed sections, each section having offset oppositely extending curved arms and a transverse bridge connecting the arms, means for anchoring ends of the arms of each section to the bridge portion of the other section and holding the sections in operative relation to each other with their arms spaced transversely from each other, a case fitted within said cylindrical field ring, an operating shaft extending through said case centrally thereof and rotatably mounted, a rotor carried by said shaft within said case, said rotor comprising a plurality of radiating arms having segmental shoes, a metallic connecting ring bracing and connecting all of the shoes, an energizing coil carried by said cylindrical field ring between the case and the other end of the cylindrical field ring, and iron lugs fixedly secured to the inner faces of the bridges of said cylindrical field ring and engaging said case at diametrically opposite points and adapted to impart magnetic impulses to said rotor.

CLARK FINCH.